No. 861,775. PATENTED JULY 30, 1907.
W. STEVENSON.
BRAKE ROD JAW.
APPLICATION FILED FEB. 23, 1907.
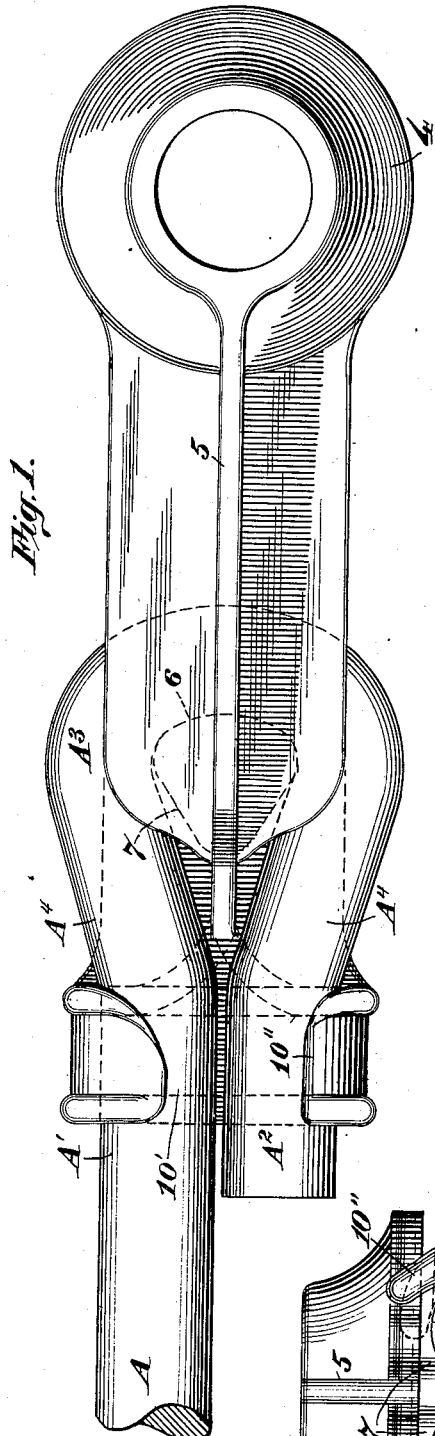
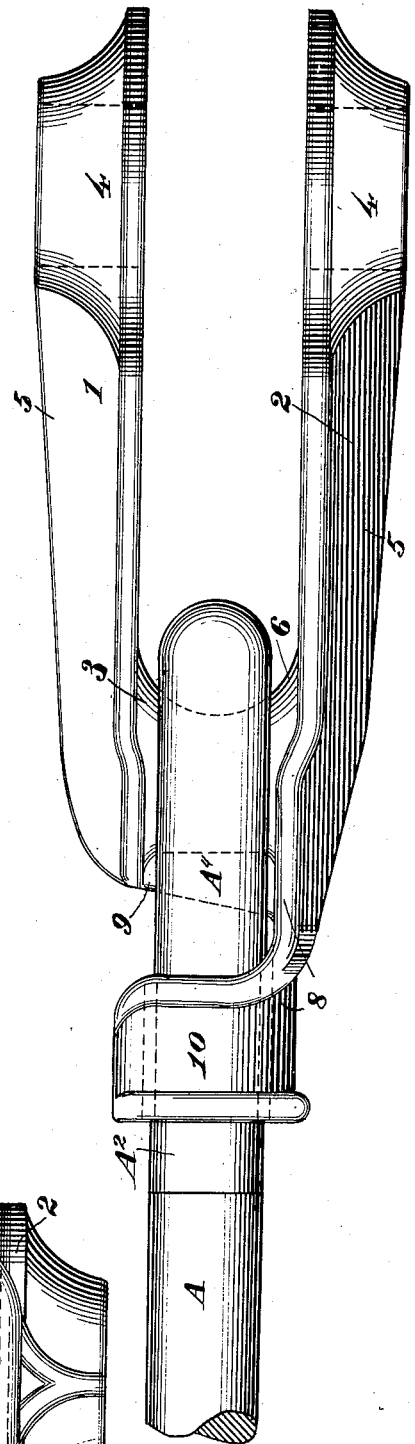
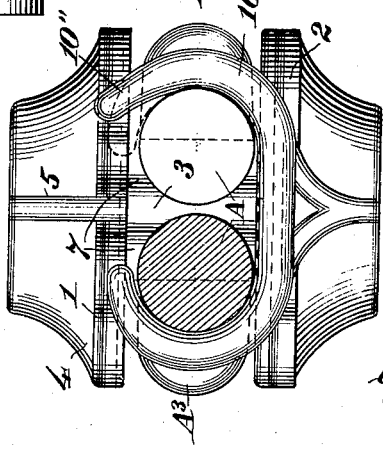
Witnesses
Inventor
William Stevenson

UNITED STATES PATENT OFFICE.

WILLIAM STEVENSON, OF CHICAGO, ILLINOIS, ASSIGNOR TO CHARLES GILBERT HAWLEY, OF CHICAGO, ILLINOIS.

BRAKE-ROD JAW.

No. 861,775.      Specification of Letters Patent.      Patented July 30, 1907.

Application filed February 23, 1907. Serial No. 358,860.

*To all whom it may concern:*

Be it known that I, WILLIAM STEVENSON, a citizen of the United States, residing at the city of Chicago, county of Cook, State of Illinois, have invented a certain new, useful, and Improved Brake-Rod Jaw, of which the following is a full, true, and exact specification.

My invention relates to improvements in brake-rod jaws and has particular reference to improvements in jaws or yokes of the class used upon the ends of brake rods which are subjected to tension as contrasted with the duty to be performed by rods of the class used when it is necessary to apply a pushing force to a brake beam or other element of a car brake system.

The object of my invention is to provide a cast or forged metal yoke or jaw of a form adapting it for easy attachment to a brake rod or the like.

A further object of my invention is to provide an improved brake-jaw which shall be especially adapted to the finishing of the ends of tension brake rods.

My invention consists generally in a device of the class mentioned comprising a jaw or yoke proper, in combination with an integral retaining band, collar, or ring, formed thereon adjacent to the cross bar portion, or closed end of the yoke or jaw, to inclose and hold the end portion of a brake rod, which is looped upon or about the cross bar portion of the jaw.

My invention also consists in particular constructions and combinations of parts, all as hereinafter described and particularly pointed out in the claims.

My invention will be more readily understood by reference to the following drawings, forming part of this specification, and in which Figure 1, is a side view of a brake-rod jaw embodying my invention. Fig. 2, is an edge view thereof, and Fig. 3, is an end view of the same.

The yoke or jaw proper of my device comprises the two sides, 1 and 2, and the cross bar portion, 3. The sides may be of any desired construction terminating in circular parts containing holes, 4, for a pivot pin. I prefer that the sides shall be provided with strengthening ribs, 5, 5, as shown. As represented in the drawings, the cross bar portion of this yoke is of novel cross section, the inner face, 6, being curved in both directions, while the outer faces, 7, 7, are substantially straight and converge, giving this portion of the yoke a substantially triangular shape, modified by the curve, 6. The cross bar portion of the yoke, together with the rear ends of the portions, 1 and 2, is commonly called the shank of the yoke. In the present case the shank is of peculiar form, being provided with an extension 8, in reality an integral projection of the portion, 2, of the same width as the part, 2, at points adjacent to the cross bar portion, 3, but widening towards the end.

The extension, 8, is preferably strengthened by a cross rib, 9, integral with the other portions of the jaw. On the end of the extension, 8, I form an elongated ring, band, or collar, 10, of sufficient size to accommodate the folded or looped end of the brake rod, A; that is, the collar, or ring, 10, is of a size to receive the ends of two rods of the required dimensions, and hence to receive the intermediate portion, A′, of the rod, and its extreme end portion, A².

While the rod is usually applied to the jaws in one of two ways hereinafter particularly described, it may be briefly said that in effect the end of the rod is passed through the ring, or collar, 10, and is then bent around the cross bar portion, 3, of the yoke, and then passed through the collar, 10. As the collar is only large enough to receive the rods, or rod portions, side by side, and as the cross bar, 3, is necessarily of considerable thickness, the loop, A³, in the end of the rod takes on a greater width than the collar, 10, so that the sides, A⁴, A⁴, of the loop, converge adjacent to the faces, 7, of the cross bar, 3, and toward the ring, where the intermediate and end portions of the rod come substantially into contact. It will be seen that although not so shown, the band of collar may be complete or unbroken, it being of course understood that the rod is heated when being formed upon the jaw, so that the end of the rod after being bent around the cross bar, 3, may be readily forced into and through the ring or collar. I prefer, however, to simplify the fastening of the rod upon or into the jaw, to the end that the threading of the rod through the ring shall be avoided, and to this end I provide the ring with an opening, 10′, wherein the rod may be laid after its end has been first roughly bent as the first step in its formation, or forging, upon or around the cross bar of the jaw. The opening, 10′, in the jaw need be only wide enough to admit the rod, as the extreme end may be readily tucked into the other side of the ring and driven through the same, but I prefer to make the opening, or gap, in the ring, somewhat wider so that the short end, A², of the rod, after being bent around the cross bar of the yoke, may be turned laterally and forced sidewise through the gap, 10, and thus placed alongside the main or intermediate portion of of the rod. To provide a gap of the necessary width, and at the same time retain enough of the ring to hold the rod securely, I prefer to form the ring portion, 10″, as shown by full lines in Fig. 3; in effect, though not literally, bending the same outwardly at a tangent to the rod. When the jaw is formed of metal which is sufficiently malleable this outwardly turned portion, 10″, may be pounded down upon the rod, as shown by dotted lines in Fig. 3, but this is usually unnecessary. After each rod has been looped or placed upon the yoke in the manner shown in the drawings, it will be obvious that tension upon the yoke and rod will have the effect of forcing the portions of the rod embraced by the ring, into or against the ends of the ring, the more securely fastening the rod, the connection between the rod and jaw being in fact more stable when the device is in use than at any other time. On the other hand, if the rod is subjected to even considerable pushing force, or compression, the form of the looped end of the rod and of the cross bar of the jaw, coupled with the engagement of the rod by the ring, or collar, insures the retention of the jaw on the rod. The device, though not strictly intended for such use, is capable of repeatedly transmitting pushing forces without detriment to itself.

As various modifications of my invention will readily suggest themselves to one skilled in the art, I do not confine my invention to the specific structure herein shown and described.

Having thus described my invention, I claim as new and desire to secure by Letters Patent:

1. A brake rod jaw having a cross bar portion and provided with an elongated ring-like extension or collar on its end at right angles to the cross bar portion, in combination with a rod bent around said cross bar portion and having its end and intermediate portions in side to side contact in said collar, substantially as described.

2. A brake rod jaw having a cross bar portion and provided with an elongated ring-like extension or collar on its end at right angles to the cross bar portion, in combination with a rod looped around said cross bar portion, and having its intermediate and end portions in side to side contact within said collar, and held thereby, substantially as described.

3. A brake rod jaw having a cross bar portion and an integral oblong ring or collar portion, free from internal obstructions or partitions, at right angles thereto, substantially as described.

4. A brake rod jaw having a cross bar portion and an integral oblong ring or collar portion, free from internal obstruction or partition, at right angles to said bar, said collar being provided with a single opening or gap in its side to admit both ends of a rod loop, substantially as described.

5. A brake rod jaw comprising a short side and a long side, a cross bar portion connecting said sides, and a loop-end holding ring formed at the end of said long side, adjacent to the cross bar portion, and internally open, to contain rod parts which are in side to side contact, substantially as described.

6. A brake rod jaw comprising a short and a long side, a cross bar portion connecting said sides, and a loop-end holding ring formed at the end of said long side, adjacent to the cross bar portion, said ring being internally free from obstruction and having a gap in its free side, as and for the purpose specified.

7. A brake rod jaw having pin openings in one end and an oblong ring at the other end, the cross bar portion of the jaw being intermediate and at right angles to the longitudinal axis of said ring, in combination with a brake rod folded about said cross bar portion, and having its end and intermediate portions in side to side contact within said ring, substantially as described.

8. A brake jaw having a cross bar portion and an elongated integral ring or collar portion at right angles thereto, the outer faces of said cross bar portion being convergent and said collar portion being provided with a gap or opening in its side and adapted to contain the looped ends of a rod in side to side contact, as and for the purpose specified.

9. In a device of the class described, a brake rod jaw having a cross bar portion and provided with an elongated integral ring or collar adjacent thereto, said collar being provided with an opening or gap in its side and having an outwardly bent portion, 10″, substantially as described.

10. In a device of the class described a brake rod jaw having a cross bar portion and provided with an elongated, integral, open collar or ring, the longitudinal axis of which is at right angles to the axis of said cross bar portion, in combination with a brake rod looped around said cross bar portion of the jaw, and having its intermediate and end portions arranged in substantial contact within said ring or collar, substantially as described.

In testimony whereof, I have hereunto set my hand, this 14th day of February, 1907, in the presence of two subscribing witnesses.

WILLIAM STEVENSON.

Witnesses:
GEORGE J. READ,
JOHN R. LEFEVRE.